US008646141B2

(12) United States Patent
Johnson et al.

(10) Patent No.: US 8,646,141 B2
(45) Date of Patent: Feb. 11, 2014

(54) LAWN SWEEPER ASSEMBLY WITH ADJUSTABLE BRUSH ASSEMBLY AND HOPPER ASSEMBLY AND METHOD OF USE THEREOF

(71) Applicant: Agri-Fab, Inc., Sullivan, IL (US)

(72) Inventors: John Johnson, Findlay, IL (US); Evan T. Ward, Chicago, IL (US); Miroslav Vuckovic, Skokie, IL (US)

(73) Assignee: Agri-Fab, Inc., Sullivan, IL (US)

( * ) Notice: Subject to any disclaimer, the term of this patent is extended or adjusted under 35 U.S.C. 154(b) by 0 days.

(21) Appl. No.: 13/751,920

(22) Filed: Jan. 28, 2013

(65) Prior Publication Data

US 2013/0139331 A1 Jun. 6, 2013

Related U.S. Application Data

(63) Continuation of application No. 12/053,965, filed on Mar. 24, 2008, now Pat. No. 8,359,694.

(51) Int. Cl.
*A46B 13/00* (2006.01)

(52) U.S. Cl.
USPC ........................................ 15/83; 15/78; 15/82

(58) Field of Classification Search
USPC ............... 15/79.1, 79.2, 82–86; 56/16.6, 202, 56/500, 504, 17.1, 17.2, 228, 375, 377, 1
See application file for complete search history.

(56) References Cited

U.S. PATENT DOCUMENTS

| 283,415 | A | 8/1883 | Passmore |
| 336,728 | A | 2/1886 | Mack |
| 939,068 | A | 11/1909 | McGrath |
| 1,081,340 | A | 12/1913 | Spangler |
| 1,333,677 | A | 3/1920 | Rauch |
| 1,470,894 | A | 10/1923 | Throop |
| 1,507,317 | A | 9/1924 | Laberge |
| 1,813,325 | A | 7/1931 | Smith |

(Continued)

FOREIGN PATENT DOCUMENTS

| DE | 4136517 | 5/1993 |
| DE | 9403681 | 7/1994 |

(Continued)

OTHER PUBLICATIONS

Machine translation of De4136517, espacenet, http://worldwide.espacenet.com/?locale=en_EP, originally retrieved Feb. 27, 2012, 2 pages.

(Continued)

*Primary Examiner* — Lee D Wilson
*Assistant Examiner* — Tyrone V Hall, Jr.
(74) *Attorney, Agent, or Firm* — Vedder Price P.C.

(57) ABSTRACT

The present disclosure relates to a lawn sweeper designed to collect debris, such as grass clippings and leaves, from a surface such as a lawn, and more particularly to a lawn sweeper with an adjustable brush assembly and characteristics associated with improved storage of such a device. A user may adjust the brush assembly with respect to the housing without needing to move the wheels. The hopper assembly may include a panel movable to be placed in at least two orientations, thereby allowing a user to change the volume within which the hopper assembly may collect debris. Methods are also disclosed for adjusting the brush assembly and for storing a lawn sweeper unit.

7 Claims, 6 Drawing Sheets

(56) References Cited

U.S. PATENT DOCUMENTS

| | | | |
|---|---|---|---|
| 1,892,961 | A * | 1/1933 | Parker ................. 15/83 |
| 2,124,835 | A | 7/1938 | Strutz |
| 2,191,601 | A | 2/1940 | Wessock |
| 2,476,526 | A | 7/1949 | Badlat |
| 2,546,620 | A | 3/1951 | VanNess |
| 2,654,106 | A | 10/1953 | Parker |
| 2,700,783 | A | 2/1955 | Parker et al. |
| 2,705,644 | A | 4/1955 | Stelzer |
| 2,712,211 | A | 7/1955 | Smith et al. |
| 2,727,264 | A | 12/1955 | Dunham |
| 2,727,265 | A | 12/1955 | Dunham |
| 2,737,673 | A | 3/1956 | Parker et al. |
| 2,801,862 | A | 8/1957 | Parker et al. |
| 2,939,717 | A | 6/1960 | Parker et al. |
| 2,945,249 | A | 7/1960 | Parker et al. |
| 2,964,896 | A | 12/1960 | Finocchiaro |
| 2,984,850 | A | 5/1961 | Law et al. |
| 3,022,530 | A | 2/1962 | Oblinger |
| 3,035,294 | A | 5/1962 | Stout et al. |
| 3,035,848 | A | 5/1962 | Parker et al. |
| 3,038,735 | A | 6/1962 | Wistrom et al. |
| 3,039,124 | A * | 6/1962 | Warner Houser et al. ...... 15/79.1 |
| 3,084,363 | A | 4/1963 | Vetne |
| 3,105,706 | A | 10/1963 | Adam |
| 3,113,332 | A | 12/1963 | Kasper |
| 3,160,908 | A | 12/1964 | Peabody et al. |
| 3,178,874 | A | 4/1965 | Hanson et al. |
| 3,184,777 | A | 5/1965 | Norden |
| 3,423,916 | A | 1/1969 | Teal |
| 3,493,987 | A | 2/1970 | Longnecker |
| 3,496,987 | A | 2/1970 | Peterson et al. |
| 3,584,351 | A | 6/1971 | Sliwinski |
| 3,591,883 | A * | 7/1971 | Armstrong et al. .......... 15/149 |
| 3,594,844 | A | 7/1971 | Hargreaves et al. |
| 3,597,786 | A * | 8/1971 | Ruhl ................. 15/79.1 |
| 3,736,736 | A | 6/1973 | Myers |
| 3,822,436 | A | 7/1974 | Burgoon |
| 3,823,435 | A | 7/1974 | Rhodes et al. |
| 3,855,763 | A | 12/1974 | Seifert et al. |
| 3,859,685 | A | 1/1975 | Doering et al. |
| 3,911,519 | A | 10/1975 | Anlas et al. |
| 3,918,119 | A | 11/1975 | Sweet |
| 4,037,284 | A | 7/1977 | McDonald |
| 4,071,920 | A | 2/1978 | Block |
| 4,158,279 | A | 6/1979 | Jackson |
| 4,221,018 | A | 9/1980 | Hajdu |
| 4,393,537 | A | 7/1983 | Reprogle et al. |
| 4,532,756 | A | 8/1985 | Merkel |
| 4,658,458 | A | 4/1987 | Berfield et al. |
| 4,714,265 | A * | 12/1987 | Franklin ............ 280/491.4 |
| 4,738,088 | A | 4/1988 | Klever et al. |
| 4,787,197 | A | 11/1988 | Schweigert |
| 4,796,322 | A | 1/1989 | Steed et al. |
| 4,825,495 | A | 5/1989 | VanGinhoven et al. |
| 4,922,696 | A | 5/1990 | Burns et al. |
| 4,936,083 | A | 6/1990 | Deutsch |
| 4,991,384 | A | 2/1991 | Steckly |
| 5,018,346 | A | 5/1991 | Ishimaru et al. |
| 5,070,687 | A | 12/1991 | Schweigert |
| 5,080,442 | A | 1/1992 | Doering et al. |
| 5,152,128 | A | 10/1992 | Stoican |
| 5,249,842 | A | 10/1993 | Doering et al. |
| 5,261,215 | A | 11/1993 | Hartz et al. |
| 5,291,722 | A | 3/1994 | Schweigert |
| 5,307,613 | A | 5/1994 | Delery |
| 5,408,813 | A * | 4/1995 | Haban et al. ................ 56/14.8 |
| 5,473,871 | A | 12/1995 | Fava et al. |
| 5,722,712 | A | 3/1998 | Pollen |
| 5,743,541 | A | 4/1998 | Cook |
| 5,802,807 | A | 9/1998 | Johnson |
| 5,868,446 | A | 2/1999 | Rossmo |
| 6,029,312 | A | 2/2000 | Whitney |
| 6,161,369 | A | 12/2000 | Monk |
| 6,490,851 | B2 | 12/2002 | Kutsukake |
| 6,595,737 | B1 | 7/2003 | Parish |
| 6,640,532 | B1 * | 11/2003 | Bogart et al. ............ 56/400.02 |
| 6,687,939 | B1 | 2/2004 | Koester |
| 6,729,515 | B2 | 5/2004 | Nicosia et al. |
| 6,764,093 | B2 | 7/2004 | Allsop et al. |
| 6,874,797 | B2 | 4/2005 | Gardenour |
| 6,957,826 | B1 | 10/2005 | MacKarvich |
| 7,219,489 | B2 | 5/2007 | Tada et al. |
| 7,249,429 | B2 | 7/2007 | Truan et al. |
| 7,430,848 | B2 | 10/2008 | Suhara et al. |
| 7,540,053 | B2 | 6/2009 | Heitfield |
| 7,686,260 | B1 | 3/2010 | Tetradis |
| 7,775,025 | B1 | 8/2010 | Coffin et al. |
| 2001/0025472 | A1 | 10/2001 | Mauzizio et al. |
| 2003/0037388 | A1 | 2/2003 | Feyma et al. |
| 2004/0060139 | A1 * | 4/2004 | Peters ................. 15/83 |
| 2006/0230557 | A1 | 10/2006 | Zellefrow et al. |
| 2007/0107404 | A1 * | 5/2007 | Hickenbottom et al. ...... 56/17.2 |
| 2009/0235472 | A1 | 9/2009 | Johnson et al. |
| 2011/0049825 | A1 | 3/2011 | Martini et al. |

FOREIGN PATENT DOCUMENTS

| | | |
|---|---|---|
| EP | 1531202 | 5/2005 |
| FR | 2352488 | 12/1977 |
| GB | 15323 | 10/1916 |
| GB | 211304 | 2/1924 |
| GB | 500675 | 2/1939 |
| GB | 508224 | 6/1939 |

OTHER PUBLICATIONS

Definition of "hinge," retrieved from http://www.hyperdictionary.com/search.aspx?define=hinge, originally retrieved Feb. 27, 2012, 3 pages.

European Patent Office, "Partial European Search Report," issued in connection with European Patent Application No. EP09153769, completed Jun. 19, 2009, 6 pages.

European Patent Office, Partial European Search Report issued in connection with European Patent Application No. 10164865, completed Oct. 4, 2010, mailed Oct. 15, 2010, 7 pages.

European Patent Office, Extended European Search Report issued in connection with European Patent Application No. 12166905.5, now European Patent No. 2499899, issued Oct. 9, 2012, 7 pages.

European Patent Office, Extended European Search Report issued in connection with European Patent Application No. 12166904.8, now European Patent No. 2497365, issued Oct. 9, 2012, 7 pages.

* cited by examiner

LAWN SWEEPER ASSEMBLY WITH ADJUSTABLE BRUSH ASSEMBLY AND HOPPER ASSEMBLY AND METHOD OF USE THEREOF

RELATED APPLICATIONS

This application is a continuation application that claims priority to and the benefit of co-pending U.S. patent application Ser. No. 12/053,965, entitled "Lawn Sweeper Assembly with Adjustable Brush Assembly and Hopper Assembly and Method of Use Thereof," which was filed on Mar. 24, 2008, the disclosure of which is incorporated herein by reference.

FIELD OF THE DISCLOSURE

The present disclosure generally relates to a lawn sweeper designed to collect debris, such as grass clippings and leaves, from a surface such as a lawn, and more particularly to a lawn sweeper with an adjustable brush assembly and characteristics associated with improved storage of such a device.

BACKGROUND

Lawn sweeping is a conventional technique used by many homeowners, gardeners, and groundskeepers to collect unwanted debris from a lawn. Such unwanted debris may include, for example, grass clippings, leaves (mulched or whole), and/or pine needles. A well groom lawn gives a good first impression, whether the well groom lawn is associated with a business or a home. Furthermore, a well groomed lawn is part of living the "American dream." For these reasons, among others, a need exists, for an improved lawn sweeper for collecting debris from a lawn.

Lawn sweepers are used in various ways for maintaining a well-groomed lawn. For example, groundskeepers will often mow a lawn, thereby creating grass clippings and autumn-shed leaves. In some instances, mulching the leaves is preferred, as many people are required to compact and bag their lawn refuse for pickup. Thus, a groundskeeper may even make multiple passes to further mulch the leaves and other lawn debris.

In brief detail, known lawn sweepers generally have a lawn sweeper unit for actually collecting the lawn debris and a hopper for storing the collected lawn debris. Known lawn sweeper units generally have a housing mounted on a set of wheels and a brush assembly including a brush, often a rotating brush, that collects debris and places it into the hopper. The hopper may consist of a bag, or it may be made of any other suitable material capable of collecting and containing debris desired to be collected. Known lawn sweepers may be self-contained units, i.e., they may further include an engine and be driven by a user. Other known lawn sweepers may, for example, be towed by a device such as a tractor or lawn mower.

The known lawn sweepers are not without their problems. For example, one feature of some lawn sweepers is an adjustable wheel assembly that allows the lawn sweeper's housing (and thus the attached brush assembly) to move with respect to the wheels. As such, the brush assembly may be positioned at various positions with respect to the ground depending on the debris being collected and the terrain over which a user is collecting the debris. For example, if a user is collecting debris from a lawn that has longer grass, it may be desirable to position the brush further above the ground when sweeping the lawn than when sweeping a lawn with shorter grass.

One problem with this feature, however, is that by adjusting the wheel assembly with respect to the housing, not only does the brush assembly's position change with respect to the ground, but the position of the housing itself with respect to the ground also changes, which may be less than desirable in some instances. Also, the weight is carried by the adjusting mechanism, rather than directly by the wheels. For example, some known lawn sweepers include a stop plate mounted to the housing at the rear of the lawn sweeper unit (just behind the brush). The stop plate may, among other things, catch lawn debris that the brush misses, thereby preventing the missed debris from remaining on the lawn. As the housing is raised with respect to the ground to allow the brush to be further from the ground, however, the distance between the bottom of the stop plate and the ground also increases since the stop plate is connected to the housing in known solutions. Thus, larger debris may pass beneath the stop plate and remain on a swept lawn, which is undesirable.

Other problems also exist with the currently known methods of adjusting the brush height of a lawn sweeper. For example, changing the height of the housing of a lawn sweeper may create problems with towing a lawn sweeper. For example, lawn sweepers often have a towing means, e.g., a tow bar, fixedly mounted to the housing. By changing the height of the housing, the height of the tow bar may also change, which may position the tow bar at an inadequate height for a given hitch on a towing apparatus, e.g., a tractor, lawn mower, all-terrain vehicle, etc.

Other problems are readily apparent in known lawn sweepers. For example, storage space is often limited, especially in homeowners' garages. Known lawn sweepers often take up highly valued space and can create storage-related problems. One known solution, for example, is a detachable hopper assembly, thereby allowing a user to store two smaller components (i.e., the hopper assembly and the lawn sweeper unit). For example, the hopper assembly may be stored by hanging it on a wall while allowing the lawn sweeper unit to take up less space on a ground position.

Therefore, in view of the above-noted problems with known lawn sweepers, among others, a need exists in the art for an improved lawn sweeper that retains all the functionality of the prior designs yet is without the undesirable characteristics of the known solutions. A need exists, for example, for an improved lawn sweeper that allows for a brush adjustment without the disadvantages of the current solutions. Further, as another example, a need also exists for a lawn sweeper that is more easily stored and takes up less storage space when not in use.

SUMMARY

The present disclosure generally relates to a lawn sweeper designed to collect debris, such as grass clippings and leaves, from a surface such as a lawn, and more particularly to a lawn sweeper with an adjustable brush assembly and characteristics associated with improved storage of such a device.

In one example embodiment, a lawn sweeper assembly includes a lawn sweeper unit and a hopper bag assembly. The lawn sweeper unit includes a housing having a front panel and two side panels, a first and second wheel connected to the side panels, and a brush assembly connected to the housing, either directly or indirectly, such as being connected to a mounting bracket or the axles of the wheels. The brush assembly is adjustable to more than one position with respect to the housing without requiring the wheels to move in order to make the brush assembly adjustment. For example, the brush assembly may rotate about the axle(s) of the wheels. The hopper bag assembly is connected to the lawn sweeper unit and includes a frame and a bag supported by the frame for collecting debris.

In another example, a hopper assembly has a panel movably connected to the frame and/or another panel. The panel is movable to be placed in a first orientation or a second orientation. In the first orientation, the volume for collecting debris within the hopper is smaller than when the panel is in the second orientation.

In another example embodiment, the hopper assembly may further include a filtering panel that allows smaller debris, such as grass, to exit the hopper assembly while retaining larger debris, such as leaves, within the hopper assembly. In one example, the filtering panel is removable, which may allow a user to replace the filtering panel with a different filtering panel, perhaps having a different filtering threshold (which may, for example, include a solid filtering panel that does not allow any debris to pass).

A method for adjusting a brush assembly connected to a lawn sweeper unit is also disclosed that includes disengaging a locking mechanism associated with the brush assembly, moving the brush assembly with respect to the housing without requiring the wheels to move to make the adjustment, and then engaging the locking mechanism.

Another example method for storing a lawn sweeper unit is also disclosed and includes removing an attached hopper assembly from a lawn sweeper unit, folding a hitch tube on the lawn sweeper unit, and storing the lawn sweeper unit in a storage position. The method may also include folding at least one assembly support bar.

BRIEF DESCRIPTION OF THE DRAWINGS

Certain embodiments are shown in the drawings. However, it is understood that the present disclosure is not limited to the arrangements and instrumentality shown in the attached drawings, wherein.

DETAILED DESCRIPTION

Figure 1:
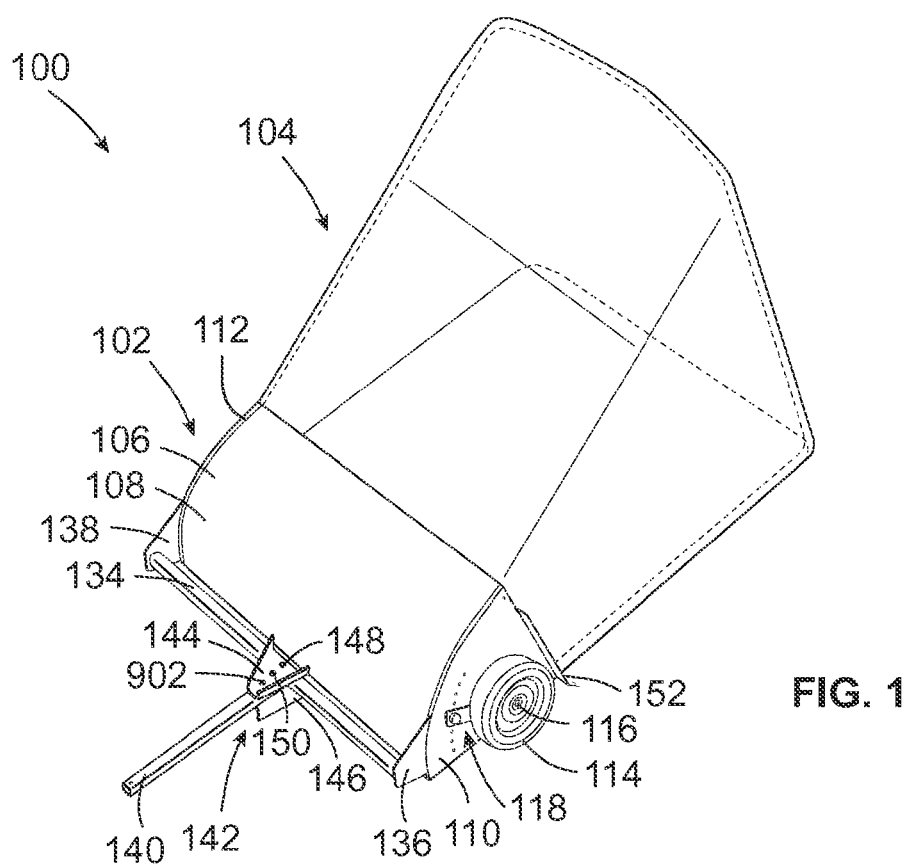
FIG. 1 is a perspective view of an example of a lawn sweeper assembly including a lawn sweeper unit and a hopper assembly.

For the purposes of promoting and understanding the principles disclosed herein, references are now made to the preferred embodiments illustrated in the drawings and specific language is used to describe the same. It is nevertheless understood that no limitation of the scope of the invention is thereby intended. Such alterations and further modifications in the illustrated device and such further applications of the principles disclosed as illustrated herein are contemplated as would normally occur to one skilled in the art to which this disclosure relates.

FIG. 1 is a perspective view of a lawn sweeper assembly 100. Lawn sweeper assembly 100 includes lawn sweeper unit 102 and hopper assembly 104, which in one example may be a hopper bag assembly (i.e., the hopper assembly 104 may include a bag, although in other examples, the hopper assembly 104 may include any suitable means for retaining collected debris, such as a more rigid plastic hopper or other suitable container).

The lawn sweeper unit 102 contains a housing 106, which includes a front panel 108, a first side panel 110, and a second side panel 112. In the particular example shown in FIG. 1, front panel 108 forms a convex surface such that the front panel 108 forms a front and top surface. The housing 106 may also include separate top panel and front panel, if desired. Furthermore, the housing may be formed from a common mold defining the panels 108, 110, and 112. One having ordinary skill in the art will recognize other alternatives for forming housing 106.

Figure 2:
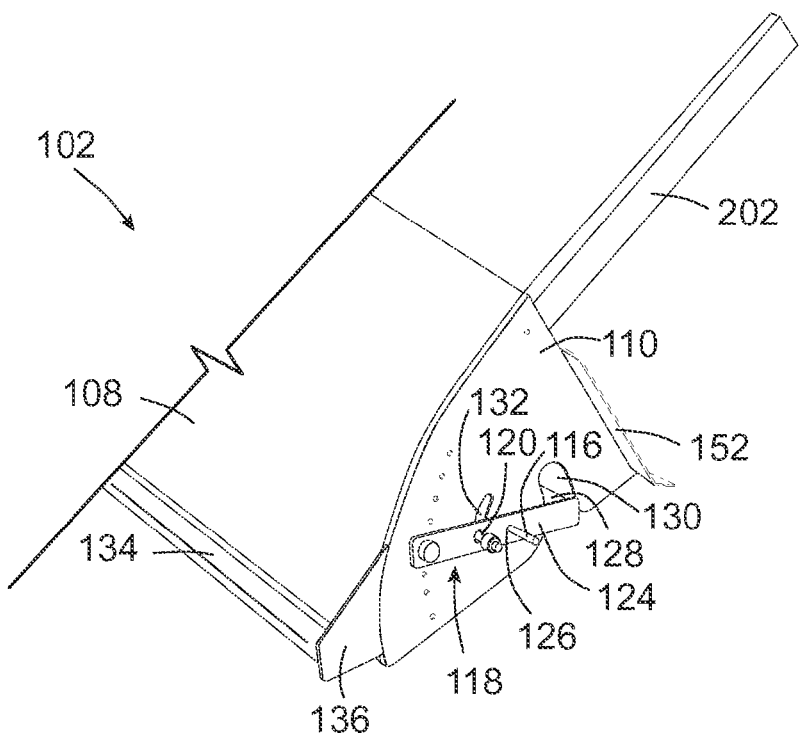
FIG. 2 is a half perspective side view of an example of a lawn sweeper unit without a wheel removed to illustrate, among other things, the brush assembly.
Figure 4:
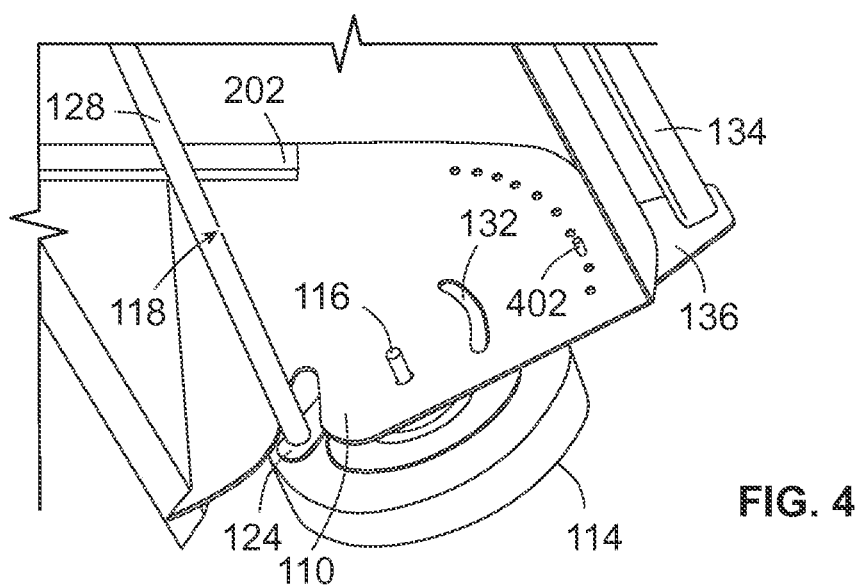
FIG. 4 is a portion of a bottom-side view showing an example of the lawn sweeper unit of FIG. 1.

The lawn sweeper unit 102 also includes a first wheel 114 connected to the first side panel 110. A second wheel (not shown) is also connected to the second side panel 112 of housing 106. The wheels 114 may be connected to the side panels 110, 112 by any suitable means. As best seen in FIGS. 2 and 4, for example, wheel 114 is connected to side panel 110 by a single axle 116. Axle 116 is connected to only the first wheel 114 such that the second wheel is on a second, separate axle and may therefore rotate independently of the first wheel 114, although it is understood that the first wheel 114 and second wheel could share a common axle. It is further understood that the wheels may be connected to the housing 106 by any suitable means and in any suitable location. For example, instead of having an axle 116 directly connected to side panel 116, a mounting bracket may be used to, for example, extend the wheel a distance from the housing 106. As another example, the wheels may be connected to the front panel or any other suitable component of the lawn sweeper assembly 100. In this example, however, the wheels 114 are in a fixed position with respect to the housing 106, i.e., since the axle 116 is fixedly mounted to the side panel 110, the wheel 114 attached to axle 116 may not move vertically with respect to the housing; it may only move rotationally. As a result, the weight of the housing 106 is carried directly by the wheels, further from the adjustable brush assembly as is commonly found in the prior art.

Lawn sweeper unit 102 further includes a brush assembly 118 connected to housing 106. As is further described below, the brush assembly 118 is adjustable to more than one position with respect to the housing without requiring the first wheel 114 or the second wheel to move with respect to the housing 106 for the brush assembly 118 to adjust to more than one position. As best shown in FIG. 2, brush assembly 118 includes a brush axle 120 upon which a brush 122 (best shown in FIG. 3) may be mounted for sweeping a lawn. Brush assembly 118 also includes a brush assembly bracket 124, connected to the brush axle 120, and having a rotational-connecting mechanism 126 for mounting the brush assembly 118 to the lawn sweeper unit 102. As best shown in FIG. 2, the rotational-connecting mechanism 126 is an inner-circumferential surface forming an aperture in the brush assembly bracket 124, wherein the aperture is adapted to receive a rod 116 such that the brush assembly bracket 124 may rotate about the rod. As shown in FIG. 2, the rod 116 is axle 116, as described above. The brush assembly 118 may also include a brush assembly bar 128 connected to the brush assembly bracket 124, which may, among other things, give added stability to the brush assembly 118 when mounted to a lawn sweeper unit 102.

In an embodiment where the brush assembly 118 includes a brush assembly bar 128, the side panel 110 may include a slit 130 through which the brush assembly bar 128 may pass as the brush assembly 118 rotates about the rod/axle 116. As one skilled in the art will recognize from the figures, particularly FIGS. 2 and 3, the side panel 110 may also include a slot 132 through which the brush axle 120 may pass as the brush assembly 118 rotates.

One skilled in the art will appreciate, although not shown, that the second side panel 112 will include the necessary corresponding components similar to those included in the first side panel 110. At a minimum, this includes a rod, similar to rod 116, upon which a second, corresponding brush assembly bracket (not shown) may rotate. It is contemplated that the brush assembly bracket may also be within the housing, not external to it.

Figure 3:
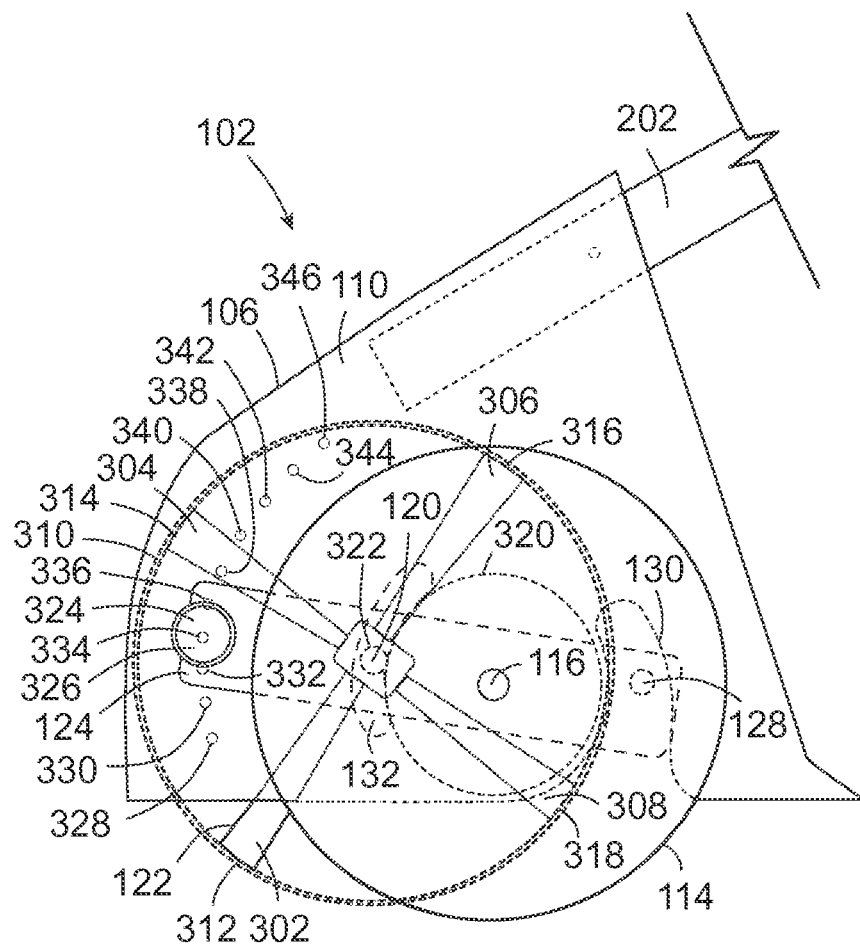
FIG. 3 is a side view of a portion of the example lawn sweeper unit of FIGS. 1 and 2 illustrating, among other things, an example of the brush assembly.

FIG. 3 shows a close-up side view of a lawn sweeper unit 102. As shown, brush 122 may include several brush arms 302, 304, 306, 308. Any suitable brush 122 known in the art may be used, however. Brush arms 302-308 are connected to brush axle 120 (either directly or indirectly) and rotate about in the orientation shown in FIG. 3, rotate in a clockwise direction. Double-dotted line 310 represents the path that the outer ends 312, 314, 316, 318 of the brush arms 302-308 follow while rotating.

In this particular example shown in FIG. 3, gear 320 is connected to axle 116, which is in turn connected to wheel 114. Thus, as the lawn sweeper unit 102 moves across the ground, the wheels rotate in a counterclockwise direction, thereby causing gear 320 to also rotate in a counterclockwise direction. Gear 320 engages with gear 322, which is connected to the brush axle 120. As such, the counterclockwise rotation of gear 320 causes gear 322, and thus the brush, to rotate in a clockwise direction. It should be understood, however, that any suitable mechanism now known or later developed may be used for rotating the brush 122. For example, gear 322 may be a geared surface of brush axle 120.

A locking mechanism 324 is also attached to the brush assembly bracket. The locking mechanism 324 may be, for example, include a knob 326 with a pin 402 designed to pass through one of the plurality of holes 322-344, which are formed by an inner surface of the first side panel 110. The locking mechanism 324, when in an engaged position, may lock the brush assembly 118 into place such that the brush assembly may not rotate about the axle of the first wheel or other mechanism allowing rotation attached to the housing 106. As one skilled in the art will appreciate, locking mechanism 324 may be any suitable locking mechanism, such as a spring-biased locking mechanism, a threaded locking mechanism, or a clip locking mechanism.

FIG. 4 shows an angled perspective view from the bottom of the lawn sweeper assembly 102. One aspect of the present example embodiment not visible in other views includes pin 402 of locking mechanism 324. Note, however, that the brush 122 is removed from this view but would be attached to the brush axle 120 (also not shown in this view) attached to the brush assembly bracket 124 and passing through slot 132.

Figure 12:
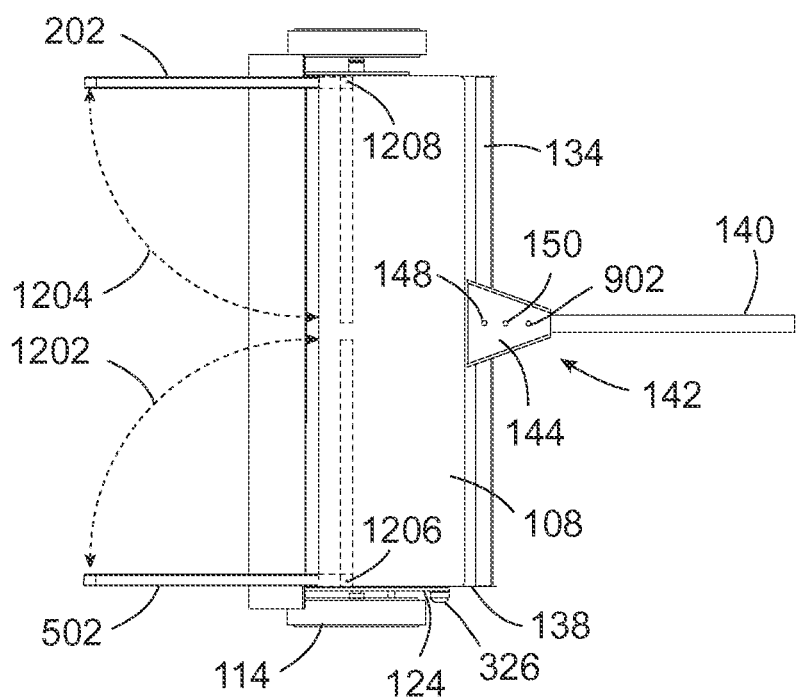
FIG. 12 is a top view of the example lawn sweeper unit of FIG. 1, without a hopper assembly, illustrating an example of folding hopper assembly support bars.

As initially shown in FIG. 2, the lawn sweeper unit 102 may also include a hopper support bar 202 connected to the housing 106. The hopper support bar 202 operates to support a hopper assembly 104, which is further discussed below. The hopper support bar 202, which may also include a corresponding hopper support bar 502, may be connected to the housing at any suitable location, such as the top, inner portion of a side panel 110, 112, the top, outer portion of side panel 110, 112, or the bottom, inner surface of the front panel 108. As best shown in FIG. 12, the hopper assembly support bars 202, 502, in one example embodiment, are foldable in a direction as indicated by dotted lines 1202, 1204. The hopper assembly support bars 202, 502 may be foldable by any suitable mechanism known in the art. For example, at pivot points 1206, 1208, a bracket may be mounted to side panels 110, 112 that allows the hopper assembly support arms 202, 502 to rotate. Furthermore, the hopper assembly support arms 202, 502 may fold themselves, i.e., they may not only fold about a bracket. In yet another variation, one end of the hopper assembly support arm 202, 502 may be fixedly attached to the housing 106, and the hopper assembly support arms 202, 502 may themselves fold. Among other things, foldable hopper assembly support arms 202, 502 allow the lawn sweeper unit 102 to take up less space when not in use.

The figures further show other features of the lawn sweeper unit 102. For example, an example embodiment that is to be towed behind a vehicle may include a tow bar 134, which may be directly connected to housing 106 or may be connected via tow bar mounting brackets 136, 138, which extend the tow bar 134 a distance away from the housing 106. In the example shown in FIG. 1, tow bar 106 is about the same width as the housing and does not extend beyond the side panels 110, 112 of the housing 106. However, tow bar 106 may be shorter or longer, if desired.

Figure 10:
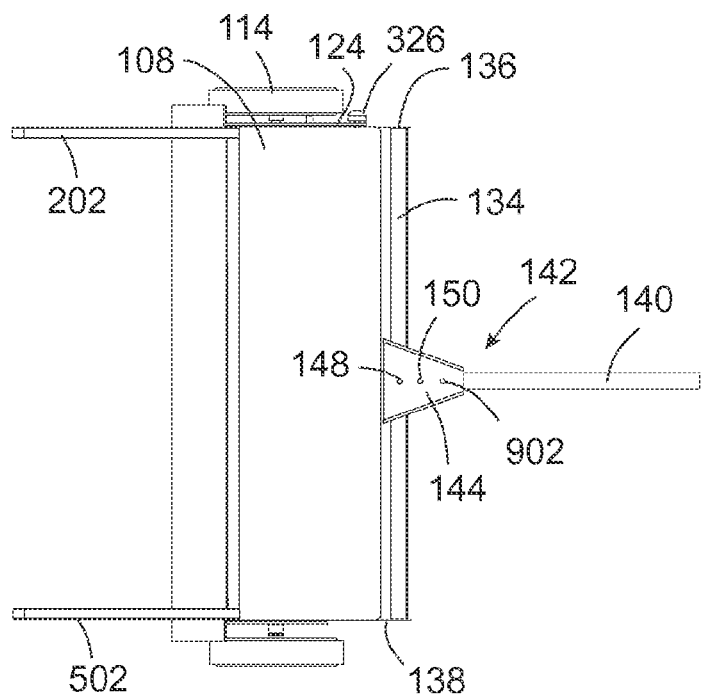
FIG. 10 is a top view of the example lawn sweeper unit of FIG. 1, without a hopper assembly, illustrating an example of a folding hitch tube in a centered position along a tow bar.
Figure 11:
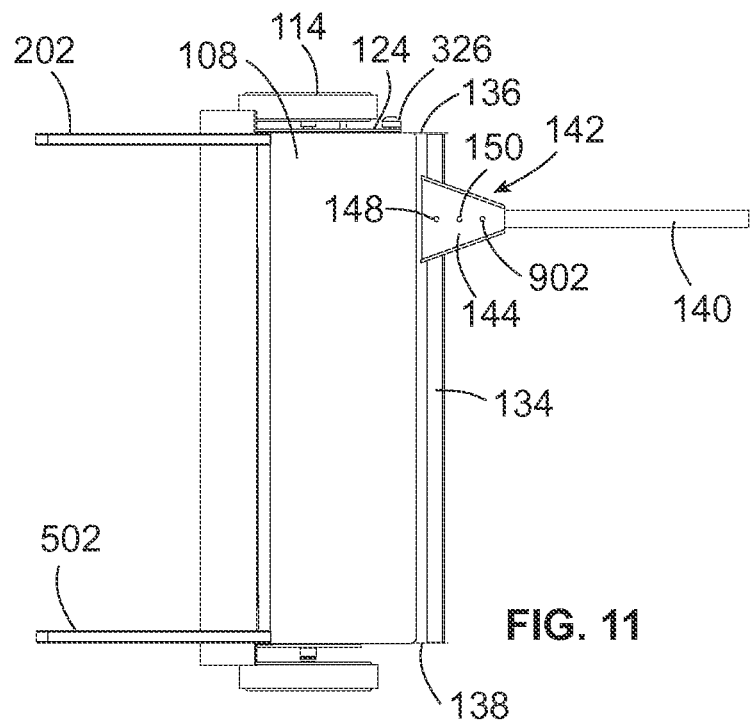
FIG. 11 is a top view of the example lawn sweeper unit of FIG. 1, without a hopper assembly, illustrating an example of a folding hitch tube in an offset position along a tow bar.

Hitch tube 140 may also be connected to the tow bar 134, and may be any suitable hitch tube (such as a pin hitch or a ball hitch). As shown in FIGS. 1, 10, and 11, the hitch tube 140 may be connected to tow bar 134 in such a way that it is movable. For example, the hitch tube 140 may be slidably connected to the tow bar 134 so that the lawn sweeper unit 102 may, for example, be towed towards the side of a vehicle.

In one example and as best shown in FIG. 11, the hitch tube 140 may be slidably connected to tow bar 134 by a mounting bracket 142, which includes a top bracket 144, a corresponding bottom bracket 146 (not shown in FIG. 11 but shown in FIG. 1), and a first bolt 148 and second bolt 150 for pulling the top bracket 144 and the bottom bracket 146 towards each other to clamp the mounting bracket 142 to the tow bar 134 such that it is not easily movable when the bolts 148, 150 are tightened. One skilled in the art, however, will recognize any number of ways to slidably connect the hitch tube 140 to the tow bar 134. The hitch tube 140 may also be directly mounted to the housing 106. Because the width of tow bar 134 is less than the width of housing 106 in the example embodiment of FIG. 1, the hitch tube 140 cannot function as an offset towing arm that extends beyond the outer edges of the housing 106.

As shown in FIG. 10, among other figures, the hitch tube 140 may still be placed in a location that is centered in respect to housing 106.

Figure 9:
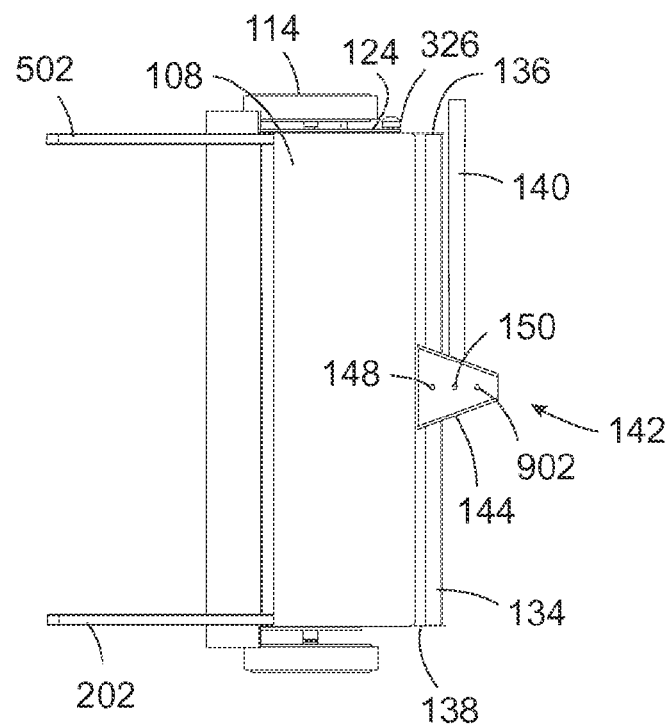
FIG. 9 is a top view of the example lawn sweeper unit of FIG. 1, without a hopper assembly, illustrating an example of a folding hitch tube.

In an interest to promote easy storage of the lawn sweeper unit 102, the hitch tube 140 may also be foldable, as illustrated, for example, in FIG. 9. For example, bolt 902 may be loosened to allow the hitch tube 140 to rotate to a position towards the housing 106, as shown. It is understood, however, that any suitable means may be used to allow hitch tube 140 to fold.

Figure 5:
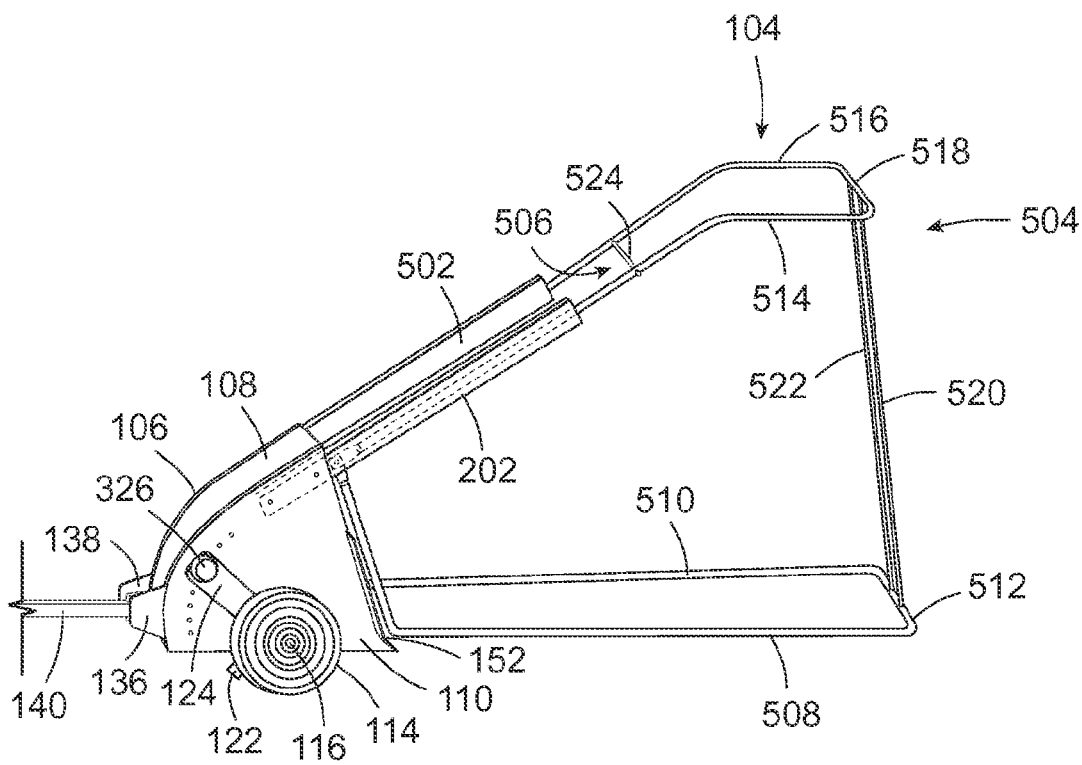
FIG. 5 is a side perspective view of the example lawn sweeper assembly of FIG. 1 without a bag attached to the hopper assembly.

Turning now to FIGS. 5-8, a hopper assembly 104 is shown. As discussed above, hopper assembly 104 may be connected to the lawn sweeper unit 102 to collect debris that the brush 122 of the lawn sweeper 102 sweeps into the hopper assembly 104. The hopper assembly 104 may sit close to, if not against, the lawn sweeper assembly 102, as shown in FIG. 5. The hopper assembly 104 may be attached directly to housing 106 or may be connected and supported by hopper assembly support arms 202, 502. In a preferred embodiment, the hopper assembly 104 is detachable (i.e., removable) from the lawn sweeper unit.

Figure 6:
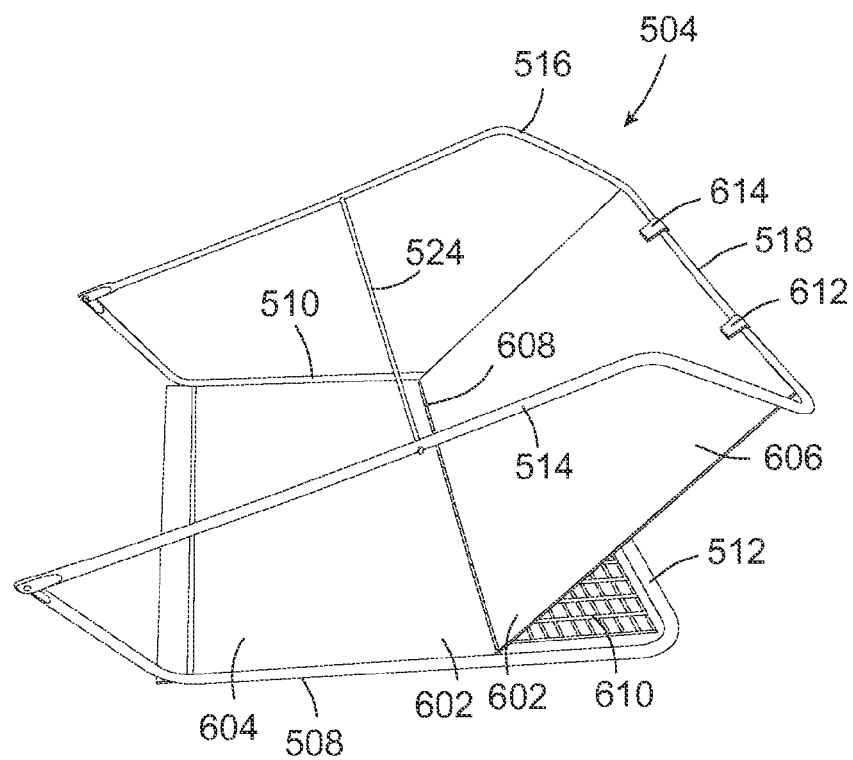
FIG. 6 is a perspective view of one example of a hopper assembly with a second bottom surface panel in a first orientation.
Figure 7:
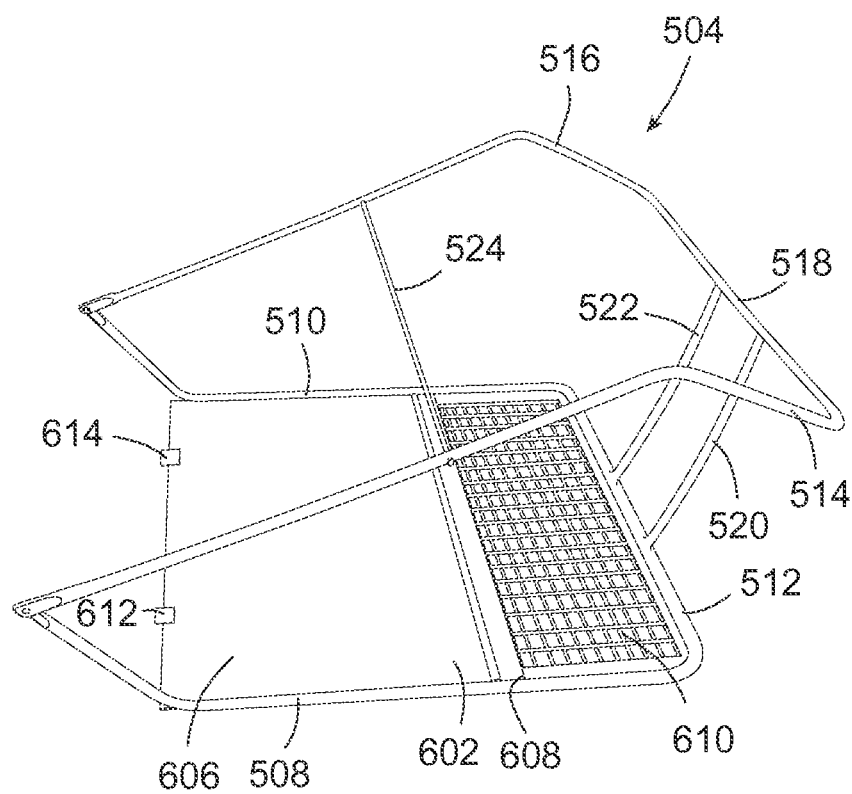
FIG. 7 is a perspective view of one example of the hopper assembly of FIG. 6 with the second bottom surface panel in a second orientation.

The hopper assembly 104 includes a frame 504 forming a volume 506 for collecting debris having a first bottom side edge 508, a second bottom side edge 510, a bottom back edge 512, a first top side edge 514, a second top side edge 516, and a top back edge 518. The frame may take any suitable form as recognized by one skilled in the art, and may be made of multiple pieces or a continuous piece of material. For example, as shown in FIGS. 6 and 7, a continuous piece of material forms the top side edge 516, top back edge 518, and top side edge 514 while a continuous piece of material forms the bottom side edge 508, the bottom back edge 512, and the second bottom side edge 510. Each portion of the frame, however, could be a separate piece of material connected together. Frame 504 may include any other suitable components, such as support vertical support members 520, 522 or horizontal support member 524.

The hopper assembly 104 also includes a bottom surface 602 having a first bottom surface panel 604 fixedly connected to the frame 504. Although the first bottom surface panel 604 is fixedly connected, it does not mean that the first bottom surface panel 604 is not removable. Instead, "fixedly" is meant to suggest that when put in place and connected to the frame, the bottom surface panel 604 is not designed to be movable with respect to the frame in order to add functionality to the hopper assembly 104.

The bottom surface 602 also includes a second bottom surface panel 606 movably connected to at least one of: the first bottom surface panel 604 and/or the frame 504. As such, the second bottom surface panel 606 can be placed in at least a first orientation (shown in FIG. 6) or a second orientation (such as that shown in FIG. 7 with the second bottom surface panel 606 being folded about hinge 608 and abutting first bottom surface panel 604). When in the first orientation, the volume for collecting debris 506 is smaller than when in the second orientation. It is noted however, that a second orientation may include completely removing the second bottom surface panel 604.

The bottom surface 602 may also include a filtering panel 610 that allows smaller debris, such as grass clippings, to exit the volume 506 of the hopper assembly 104 while allowing the hopper assembly 104 to retain larger debris, such as leaves. The filtering panel 610 may take any suitable form that discriminates, to some extent, between debris elements of different sizes. Thus, for example, filtering panel 610 could be a grate, a grid, a series of holes in a panel, a net, or any other suitable structure made of any suitable material. Furthermore, the filtering panel 610 may be removable so that other filtering panels with different filtering thresholds may be used in its place. For example, one filtering panel may have mesh openings 1⅝" wide while another filtering panel may have mesh openings measuring 1⅜".

The filtering panel 610 may be attached to the hopper assembly 104 and the second bottom surface panel 606 may be retained in the first or second orientation by any suitable means, such as a hook and loop material, snaps, buttons, ties, or straps. For example, hook and loop material 612 and 614 is used to hold the second bottom surface panel 606 in the first orientation shown in FIG. 6 by connecting to the frame 504, while the hook and loop material 612, 614 holds the second bottom surface panel 606 against the first bottom surface panel 604 in the second orientation shown in FIG. 7.

Figure 8:
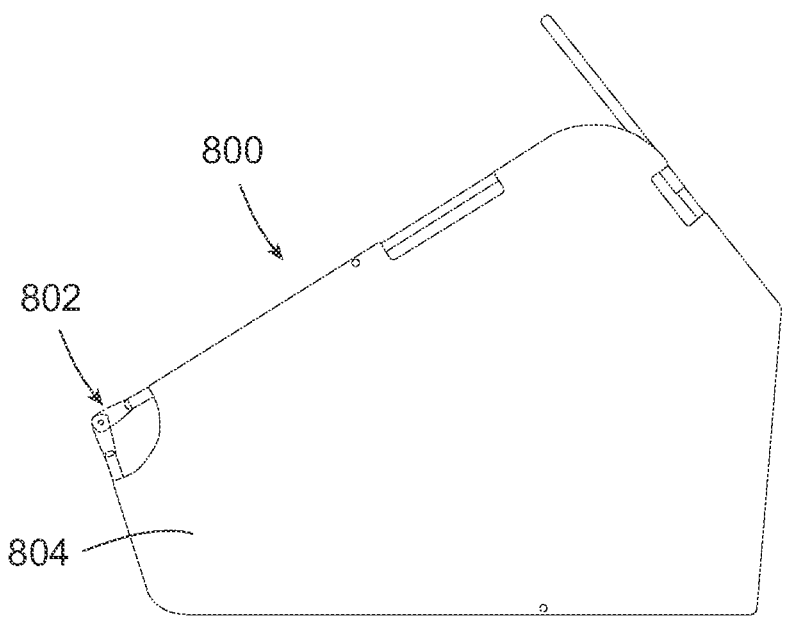
FIG. 8 is a side view of another example of a hopper assembly including a bag.

As best shown in FIG. 8, a hopper bag assembly 800 may include a frame 802 and a bag 804 supported by the frame 802 for collecting debris. The hopper bag assembly 800 is similar to hopper assembly 104, except it includes a bag 804, and the frame 802 takes a different form. This illustrates, among other things, that a hopper assembly may take any suitable shape or form. Furthermore, the bag may be made of any suitable material and may even be plastic panels (i.e., a hard cover "bag") that fit within the frame. Furthermore, the frame 802 may not even be a separate component from the bag, i.e., the bag 804 could be a container made of a rigid material and the "frame" 802 could be the edges of the container for collecting debris.

Furthermore, one or more methods associated with a lawn sweeper assembly 100 are readily apparent based on this disclosure. For example, a method for adjusting a brush assembly 118 connected to a lawn sweeper unit 102 may include disengaging a locking mechanism 324 that is associated with the brush assembly 118; moving the brush assembly with respect to the housing 106 without moving the wheels with respect to the housing 106; and engaging (i.e., reengaging) the locking mechanism 324 such that the brush assembly 118 is in a different position with respect to the housing 106, thereby causing the brush 122 to be further from or closer to when the lawn sweeper unit 102 is in operation. The moving of the brush assembly 118 may involve rotating a brush assembly bracket 124, associated with the brush assembly 118, about an axle 116 of a first wheel 114 connected to the housing 106.

It is understood, however, that the method may include any intervening steps and/or steps prior to or after the steps disclosed herein. It is further understood that in view of the described example embodiments of a lawn sweeper unit 102 and a hopper assembly 104, other methods are apparent to one skilled in the art. For example, a method may include sliding a hitch tube 140 along a tow bar 134 from a first position to a second position, folding a hitch tube 140, folding a hopper assembly support bar 202, 502, or removing or connecting a hopper assembly 104 from/to a lawn sweeper unit 102 by, for example, using one or more hopper assembly support bars. Furthermore, the method may include storing the lawn sweeper unit in a storage position. A storage position may include any position allows the lawn sweeper assembly 100 to occupy less space or in a preferable manner than when the lawn sweeper assembly 100 is set up for operation. Thus, for example, removing the hopper assembly 104 may allow a user to hang the hopper assembly 104 out of the way while allowing the lawn sweeper unit to occupy less space on a storage surface, such as the floor of a garage or shed. Another storage position may include having the hitch tube 140 folded in towards the tow bar 134. When in this position, the hitch tube does not protrude as far, thereby allowing more convenient storage, as one skilled in the art will appreciate. Another storage position may include, for example, having the hopper assembly support bars 202, 502 folded (or even removed) to create a more compact unit for storage. One having ordinary skill in the art will recognize other storage positions (e.g., standing a lawn sweeper 102 on an end or in a non-operating orientation so that the footprint of the lawn sweeper unit 102 is smaller).

In view of this disclosure, one skilled in the art will recognize several advantages of the disclosed lawn sweeper assembly and methods associated therewith. For example, one skilled in the art will recognize that a brush assembly 118 that is adjustable with respect to the housing 106 without requiring wheels 114 to move allow the brush to operate closer or more distant from the ground to sweep a lawn or other desired surface without changing the distance the housing 106 is from the ground. Thus, for example, stopper plate 152 may be longer (since the housing is never lowered towards the ground), thereby allowing stopper plate 152 to catch more debris that is not swept up by the brush 122. As another advantage, one skilled in the art will recognize that features such as a foldable hitch and foldable hopper assembly support bars, among other things, will allow a user to store a lawn sweeper assembly 100 in a preferred storage position which may, among other things, be more compact and/or occupy a smaller overall footprint when in such a storage position.

Furthermore, while the particular preferred embodiments have been shown and described, it is obvious to those skilled in the art that changes and modifications may be made without departing from the teaching of the disclosure. The matter set forth in the foregoing description and accompanying drawings is offered by way of illustration only and not as limitation. The actual scope of the disclosure is intended to be defined in the following claims when viewed in their proper perspective based on the related art.

What is claimed is:

1. A lawn sweeper assembly comprising: a lawn sweeper unit including: a housing including a front panel, a first side panel, and a second side panel; a tow bar connected to the housing including a hitch tube slidably connected to the tow bar so as to be movable between the first and second side panels, and foldable with respect to the tow bar so as to be disposed in a storage orientation substantially parallel to the tow bar and within the first and second side panels; a brush assembly connected to the housing, the brush assembly including a bracket directly connected to the housing via a rotational-connecting mechanism, a locking mechanism disposed on a first end of the bracket, and a brush axle connected to the bracket between the locking mechanism and the rotational-connecting mechanism and adjustable to more than one position with respect to the ground so as to adjust a brush with respect to the ground without requiring movement of the housing with respect to the ground; and a hopper bag assembly, connected to the lawn sweeper unit, including: a frame; and a bag supported by the frame for collecting debris.

2. The lawn sweeper assembly of claim 1, wherein each of the first and second side panels including a slot such that a brush axle connected to a bracket of the brush assembly extends therethrough.

3. The lawn sweeper assembly of claim 1, wherein a mounting bracket is connected to the tow bar and the hitch tube and the hitch tube is movable through approximately 180 degrees regardless of position of the bracket on the tow bar.

4. The lawn sweeper assembly of claim 1, wherein an operative orientation of the hitch tube is defined when the hitch tube is disposed normal to the tow bar regardless of position of the bracket on the tow bar.

5. A lawn sweeper assembly comprising: a lawn sweeper unit including: a housing including a front panel, a first side panel, and a second side panel; a tow bar connected to the housing including a hitch tube slidably connected to the tow bar so as to be selectively movable between the first and second side panels, and foldable with respect to the tow bar so as to be disposed in a storage orientation substantially parallel to the tow bar and within the first and second side panels; a brush assembly connected to the housing, the brush assembly including a bracket directly connected to the housing via a rotational-connecting mechanism, a locking mechanism disposed on a first end of the bracket, and a brush axle having a first end that extends through a slot in at least one of the first side panel and the second side panel to connect to the bracket and adjustable to more than one position so as to adjust a brush with respect to the ground without requiring movement of the housing with respect to the ground; and a hopper bag assembly, connected to the lawn sweeper unit, including: a frame; and a bag supported by the frame for collecting debris.

6. The lawn sweeper assembly of claim 5, wherein a mounting bracket is connected to the tow bar and the hitch tube and the hitch tube is movable through approximately 180 degrees regardless of position of the bracket on the tow bar.

7. The lawn sweeper assembly of claim 5, wherein an operative orientation of the hitch tube is defined when the hitch tube is disposed normal to the tow bar regardless of position of the bracket on the tow bar.

* * * * *